United States Patent
Berens

(10) Patent No.: US 9,043,204 B2
(45) Date of Patent: May 26, 2015

(54) THOUGHT RECOLLECTION AND SPEECH ASSISTANCE DEVICE

(75) Inventor: Scott H. Berens, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 13/612,151

(22) Filed: Sep. 12, 2012

(65) Prior Publication Data

US 2014/0074464 A1    Mar. 13, 2014

(51) Int. Cl.
*G10L 15/08* (2006.01)
*G10L 15/22* (2006.01)

(52) U.S. Cl.
CPC ...................... *G10L 15/22* (2013.01)

(58) Field of Classification Search
CPC ................................ G01L 15/08; G01L 15/22
USPC ......... 704/235, 243, 246, 248, 270, 271, 275, 704/251
See application file for complete search history.

(56) References Cited

U.S. PATENT DOCUMENTS

| | | | | |
|---|---|---|---|---|
| 5,113,481 A * | 5/1992 | Smallwood et al. | .......... | 704/271 |
| 5,161,199 A * | 11/1992 | David | ........................... | 704/201 |
| 7,366,667 B2 * | 4/2008 | Dobler | .......................... | 704/241 |
| 7,672,845 B2 * | 3/2010 | Beranek et al. | ............... | 704/251 |
| 7,805,224 B2 * | 9/2010 | Basson et al. | .................. | 704/200 |
| 7,901,211 B2 * | 3/2011 | Pennebaker | .................... | 704/271 |
| 8,589,159 B2 * | 11/2013 | Morisaki | ....................... | 704/235 |
| 8,595,015 B2 * | 11/2013 | Lee et al. | ........................ | 704/270 |
| 8,682,678 B2 * | 3/2014 | Malkin et al. | .................. | 704/278 |
| 2002/0116183 A1 * | 8/2002 | Waryas et al. | ................. | 704/209 |
| 2006/0177799 A9 * | 8/2006 | Stuart et al. | .................... | 704/271 |
| 2007/0100626 A1 * | 5/2007 | Miller et al. | ................... | 704/258 |
| 2009/0099848 A1 * | 4/2009 | Lerner et al. | ................... | 704/271 |
| 2009/0210232 A1 | 8/2009 | Sanchez | | |
| 2010/0121973 A1 * | 5/2010 | Lobacheva et al. | ........... | 709/231 |
| 2010/0174533 A1 * | 7/2010 | Pakhomov | .................... | 704/205 |
| 2010/0241429 A1 * | 9/2010 | Siminoff | ........................ | 704/235 |
| 2011/0144980 A1 * | 6/2011 | Rysenga | ........................ | 704/201 |
| 2012/0016678 A1 | 1/2012 | Gruber et al. | | |
| 2012/0284024 A1 * | 11/2012 | Mahalingam | ................. | 704/235 |
| 2013/0041661 A1 * | 2/2013 | Lee et al. | ........................ | 704/235 |
| 2013/0253924 A1 * | 9/2013 | Ichimura et al. | ............... | 704/233 |
| 2013/0253936 A1 * | 9/2013 | Harvey | ...................... | 704/270.1 |
| 2014/0129235 A1 * | 5/2014 | Suvanto | ........................ | 704/276 |
| 2014/0297279 A1 * | 10/2014 | Miller et al. | ................... | 704/235 |

* cited by examiner

*Primary Examiner* — Martin Lerner
(74) *Attorney, Agent, or Firm* — DeLizio Gilliam, PLLC

(57) ABSTRACT

Some embodiments of the inventive subject matter include a method for detecting speech loss and supplying appropriate recollection data to the user. Such embodiments include detecting a speech stream from a user, converting the speech stream to text, storing the text, detecting an interruption to the speech stream, wherein the interruption to the speech stream indicates speech loss by the user, searching a catalog using the text as a search parameter to find relevant catalog data and, presenting the relevant catalog data to remind the user about the speech stream.

18 Claims, 3 Drawing Sheets

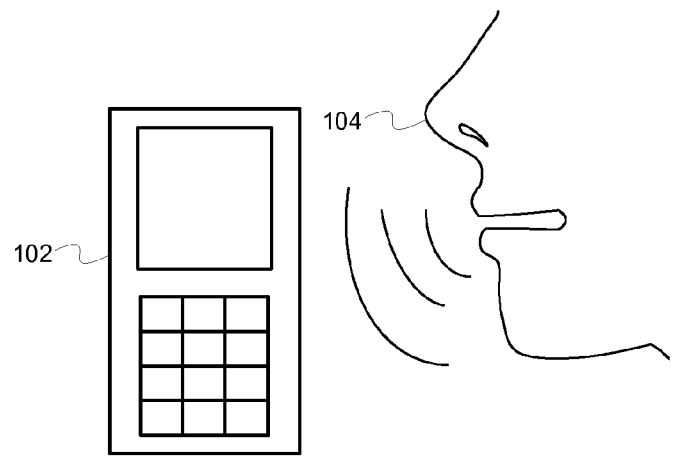
FIG. 1A
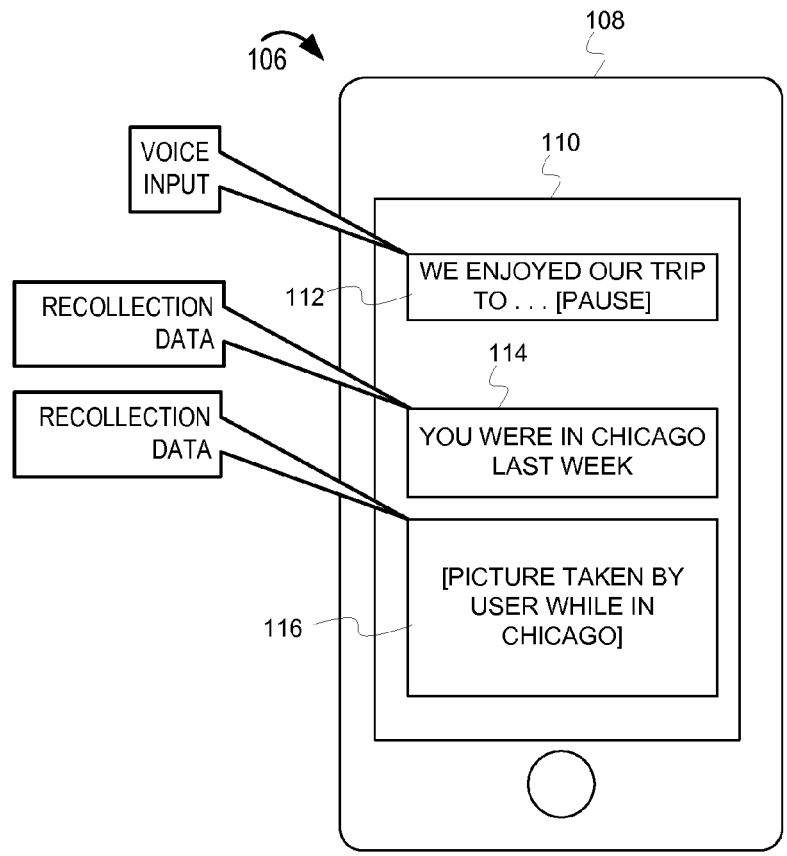
FIG. 1B
FIG. 1

THOUGHT RECOLLECTION AND SPEECH ASSISTANCE DEVICE

BACKGROUND

Embodiments of the inventive subject matter generally relate to the field of voice and speech recognition software and its uses, and more particularly voice and speech recognition and assistance with speech.

Today, many electronic devices (e.g. mobile phones, tablets, computers, and televisions) can receive voice input from a user. Allowing voice input provides a user with a hands-free alternative to interact with the device. This is especially popular in the mobile phone industry. In the mobile phone industry, voice input can be used to allow a user to provide commands to a mobile phone without diverting their hands or attention from another task. Although there are currently many uses for both voice and speech recognition software in mobile phone applications, a use does not exist which assists users that have trouble with speech loss. Speech loss can occur for many reasons, including disease or recovery from disease, surgery, etc. One predominant cause of speech loss is Alzheimer's disease. Users suffering from Alzheimer's disease may have trouble completing sentences because they are unable to remember the information they wish to convey in their sentences in full detail. Likewise, user's suffering dementia may have a difficult time completing sentences because they are unable to remember the information they wish to convey in their sentences in full detail. Additionally, patients recovering from a stroke may likewise find it difficult to communicate effectively because of an inability to describe thoughts in words. In addition to speech loss occurring due to disease, speech loss can also occur because of old age, poor memory, or even sleepiness.

SUMMARY

Some embodiments of the inventive subject matter may include a method for detecting speech loss and supplying appropriate recollection data to the user. The method can include detecting a speech stream from a user. The method can include converting the speech stream to text. The method can include storing the text. The method can include detecting an interruption to the speech stream, wherein the interruption to the speech stream indicates speech loss by the user. The method can include searching a catalog using the text as a search parameter to find relevant catalog data. The method can include presenting the relevant catalog data to remind the user about the speech stream.

BRIEF DESCRIPTION OF THE DRAWINGS

The present embodiments may be better understood, and numerous objects, features, and advantages made apparent to those skilled in the art by referencing the accompanying drawings.

FIG. 1a depicts a user 104 providing voice input to a speech-assist device 102.

FIG. 1b is a diagrammatic illustration of one embodiment of a speech-assist device 106 interface.

DESCRIPTION OF EMBODIMENT(S)

Figure 2:
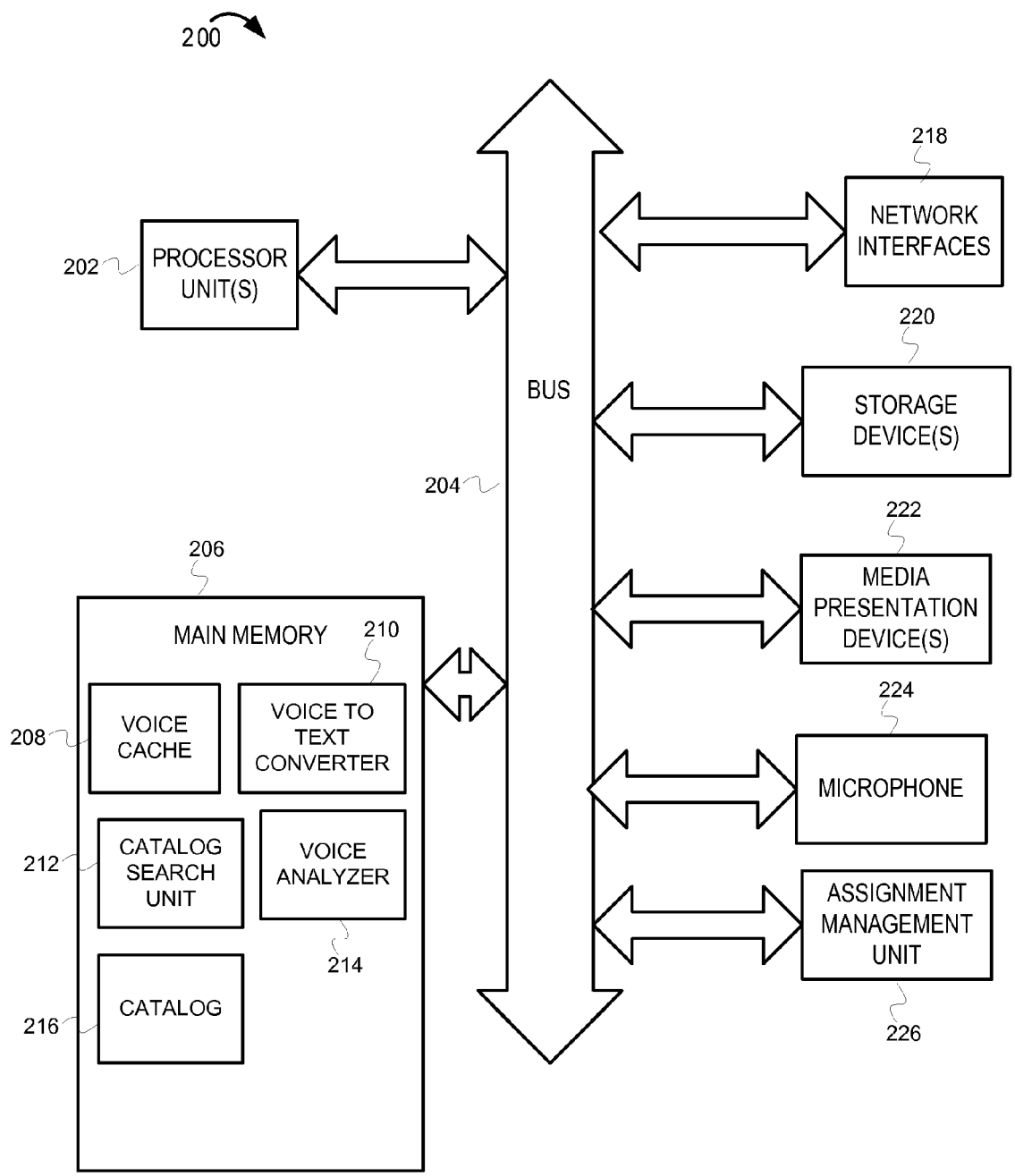
FIG. 2 is a block diagram of a speech-assist device 200.

Some embodiments of the invention work with a computational device, such as a mobile phone, to allow the "recollection" of a user's memory upon recognizing a fault or delay in their speech. In one embodiment, the speech-assist device may utilize both voice recognition and speech recognition. The speech-assist device may utilize voice recognition to focus only on the user's voice, disregarding errant voices and environmental din. The speech-assist device may utilize speech recognition to convert the input speech into a text string. The speech-assist device may then store recent segments of text strings in memory. Should the user pause for a significant period of time, or otherwise provide input indicative of speech loss, the speech-assist device may use the mobile device's internal search capabilities to search using all or a portion of the stored text as a search parameter. The speech-assist device may search through the user's contacts, photographs, current or past GPS locations, text messages, emails, etc. to find information relevant to the user's conversation. Upon finding relevant information, the speech-assist device may present the information to the user, through visual or auditory cues, recollecting the user's memory and allowing continuation of speech.

The description that follows includes exemplary systems, methods, techniques, instruction sequences and computer program products that embody techniques of the present inventive subject matter. However, it is understood that the described embodiments may be practiced without these specific details. For instance, although examples refer to the speech-assist device as an application running on a mobile phone or other computing device, in other embodiments of the inventive subject matter the speech-assist device may run as a stand-alone unit on a dedicated computing device. In other instances, well-known instruction instances, protocols, structures and techniques, relating to voice recognition and speech recognition specifically, have not been shown in detail in order not to obfuscate the description.

FIG. 1a depicts a user 104 providing voice input to a speech-assist device 102. In FIG. 1a, the user 104 is speaking in proximity of the speech assist-device 102. In turn, the speech-assist device 102 is receiving the user's 104 speech as input.

FIG. 1b is a diagrammatic illustration of one embodiment of a speech-assist device 106 interface. The speech-assist device 106 comprises a computing device 108 and a method for presenting output (in this embodiment a display) 110. In some embodiments, the display 110 may present to the user a textual display of the recent input 112. Upon detecting speech loss, the speech-assist device 106 may determine the appropriate recollection data. In some embodiments, based on appropriate circumstances, the speech-assist device 106 may present recollection text 114 or other recollection data, such as a recollection picture 116. It is unnecessary that the speech assist device 106 include a display 110. In some embodiments, the speech-assist device 106 may provide auditory recollection data output. In embodiments comprising a display 110, recollection data may be presented as text, images, contact information, GPS information, etc.

FIG. 2 is a block diagram of a speech-assist device 200. The speech-assist device 200 includes a processor unit 202 (possibly including multiple processors, multiple cores, multiple nodes, and/or implementing multi-threading, etc.). The speech-assist device includes memory 206. The memory 206 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The memory 206 may include a voice cache 208, a voice to text converter 210, a catalog search unit 212, a voice analyzer 214, and a catalog 216. The speech-assist device also includes a bus 204 (e.g., PCI, ISA, PCI-Express, HyperTransport®,InfiniBand®, NuBus, etc.), a network interface 218 (e.g., an ATM interface, an Ethernet interface, a Frame Relay interface, SONET interface, wireless interface, etc.), a storage device(s) 220 (e.g., optical storage, magnetic storage, etc.), and an assignment management unit 226. The assignment management unit 226 embodies functionality to implement embodiments described above. The assignment management unit 226 may include one or more functionalities that facilitate assignment of data elements in a data association interface. Although depicted as being coupled to the bus 204, the assignment management unit 226 may be embodied in the memory 206. Any one of these functionalities may be partially (or entirely) implemented in hardware and/or on the processing unit 202. For example, the functionality may be implemented with an application specific integrated circuit, in logic implemented in the processing unit 202, in a co-processor on a peripheral device or card, etc. Further, realizations may include fewer or additional components not illustrated in FIG. 2 (e.g., video cards, audio cards, additional network interfaces, peripheral devices, etc.). The processor unit 202, the storage device(s) 220, and the network interface 218 are coupled to the bus 204. Although illustrated as being coupled to the bus 204, the memory 206 may be coupled to the processor unit 202.

In FIG. 2, a speech stream from the user is captured as input by a microphone 224. The speech stream is then stored in a voice cache 208 within the main memory 206 of the speech-assist device 200, where the speech stream is converted from audio to text by the voice-to-text converter 210. Additionally, in some embodiments, the speech-assist device 200 may incorporate voice recognition technology. In such embodiments, a voice analyzer 214 may determine whether the speech stream is the user's voice, or otherwise errant noise. Upon detecting speech loss, the speech-assist device 200 may utilize a catalog search unit 212 to search a catalog 216 of media recently accessed by the user. Upon finding relevant recollection data, the speech-assist device 200 may then present the recollection data to the user via a media presentation device 222.

Figure 3:
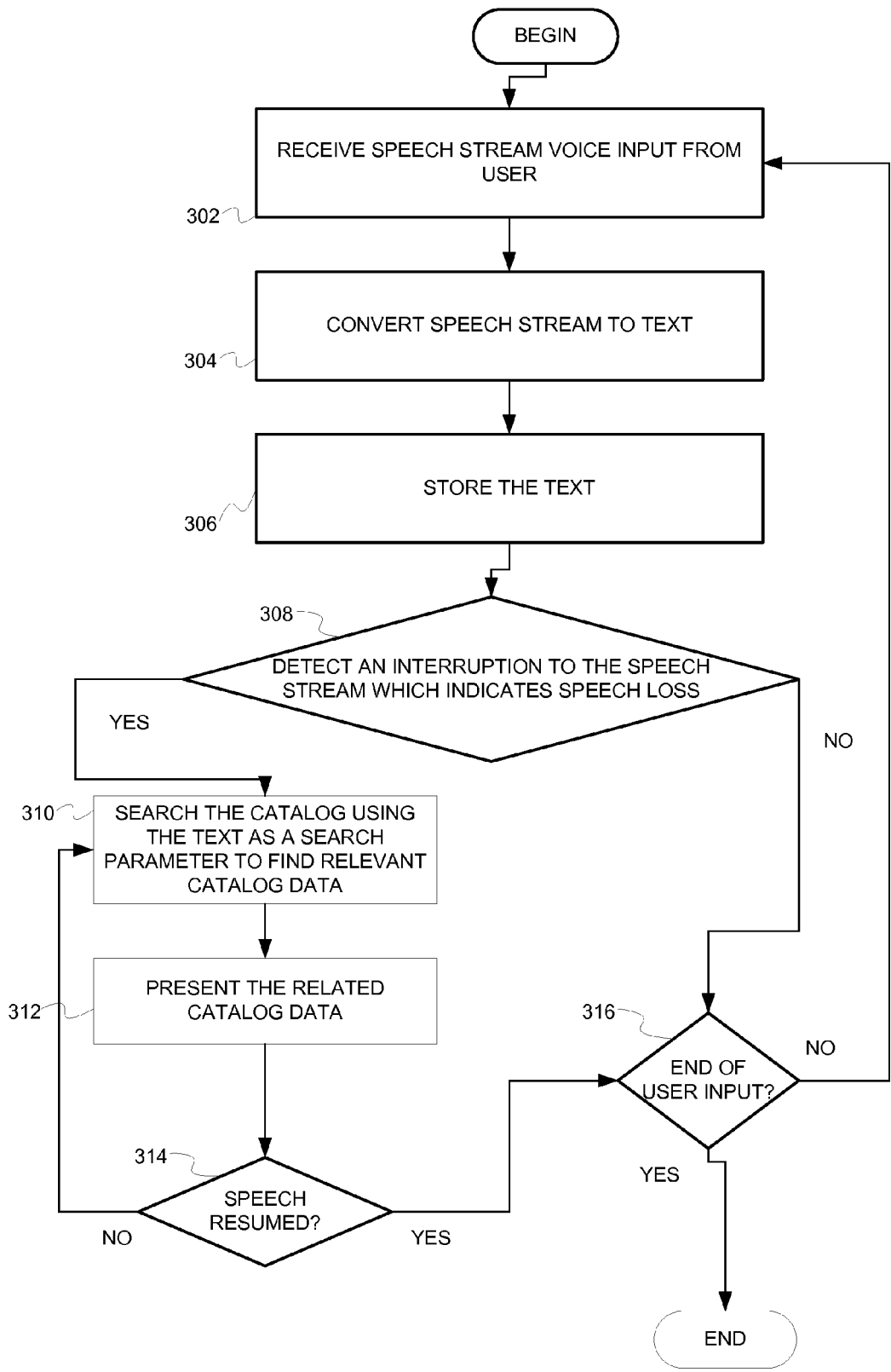
FIG. 3 is a flow diagram illustrating operation for interpreting input and presenting recollection data.

FIG. 3 is a flow diagram illustrating operation for interpreting input and presenting recollection data. The operations of flow 300 begin at block 302. At block 302, the speech-assist device receives voice input from the user in the form of a speech stream. In some embodiments, the speech-assist device may include a voice analyzer to utilize voice recognition technology, which may allow the speech-assist device to accept only the user's speech as input for the speech string. The flow continues at block 304.

At block 304, the speech-assist device converts the speech stream to text. In some embodiments, the speech-assist device may utilize speech recognition technology to convert the speech stream into text. The flow continues at block 306.

At block 306, the speech-assist device stores the text. In some embodiments, the speech-assist device may store only the last ten to fifteen words of text from the speech stream. In other embodiments, the speech-assist device may store more or less of the speech stream. The flow continues at block 308.

At block 308, the speech-assist device determines if there is an interruption to the speech stream indicating speech loss. In some embodiments, a long pause in the speech stream may indicate speech loss. In other embodiments, specific words or phrases can be utilized by the user to indicate speech loss. In other embodiments, the speech-assist device may employ controls which may allow the user to indicate speech loss. Such controls may comprise buttons on the device that may allow a user to signal speech loss.

In some embodiments of the inventive subject matter, the speech-assist device can be "trained" by the user, setting a threshold pause length that will indicate speech loss. In other embodiments, the speech-assist device may be trained using the aforementioned controls. In such embodiments, a user may indicate whether recollection data was unnecessary when it was supplied, and likewise indicate whether recollection data was necessary when it was not supplied. If speech loss is detected, the flow continues at block 310.

At block 310, the speech-assist device searches the catalog using the text as a search parameter. The flow continues at block 312.

At block 312, relevant catalog data is presented to the user. Relevant catalog data may consist of any type of media. For example, the catalog data may consist of a photograph, an email, a contact list, a text message, a recital of recent GPS locations, or information from the calendar. In some instances, the relevant data may simply consist of the portion of the sentence before speech loss. In such instances, the speech-assist device may simply display the last ten to fifteen words that have been converted to text. The flow continues at block 314.

At block 314, the speech-assist device determines if the user's speech has resumed. If the user's speech has not resumed, the flow returns to block 310. If the user's speech has resumed, the flow continues at block 316.

At block 316, if the user's input is complete, the process ends. If the user's input is not complete, the flow returns to block 302.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    detecting, via a microphone of an electronic device, an audible speech stream;
    converting the audible speech stream to text;
    detecting speech loss in the audible speech stream indicating an inability to complete a thought associated with the audible speech stream;
    generating a query in response to the detecting the speech loss, wherein the query includes at least a portion of the text;
    searching a catalog on the electronic device using the query to find related catalog data, wherein the catalog includes one or more of text strings, images, contact information, and global positioning system information associated with the electronic device; and
    presenting the related catalog data.

2. The method of claim 1, wherein the related catalog data is presented visually.

3. The method of claim 1, wherein the related catalog data is presented audibly.

4. The method of claim 1, wherein the speech loss is detected by a divergence from a normal speech pattern.

5. The method of claim 1, wherein the speech loss is detected via user input.

6. The method of claim 1, wherein the detecting speech loss is trained via user training input.

7. The method of claim 1, wherein the speech loss is detected by a gap in speech which exceeds a predetermined length of time.

8. The method of claim 1, further comprising
    distinguishing a user's input from other speakers having conversations within the vicinity of the user, wherein the audible speech stream includes the user's input.

9. The method of claim 1, wherein the related catalog data is presented via a preferred media-type, the preferred media-type indicated via user input.

10. An apparatus for speech-assist, the apparatus comprising:
    a processor; and
    a computer readable storage medium having computer usable program code embodied therewith, the computer usable program code executable by the processor to cause the apparatus to:
        detect, via a microphone of the apparatus, an audible speech stream;
        convert the audible speech stream to text;
        detect speech loss in the audible speech stream indicating an inability to complete a thought associated with the audible speech stream;
        generate a query in response to the detection of speech loss, wherein the query includes at least a portion of the text;

search a catalog on the apparatus using the query to find related catalog data, wherein the catalog includes one or more of text strings, images, contact information, and global positioning system information recently accessed via the apparatus; and present, on at least one media presentation device of the apparatus, the related catalog data.

11. The apparatus of claim 10, wherein the apparatus is configured to detect the audible speech stream associated with a particular user.

12. The apparatus of claim 10, further comprising one or more input mechanisms operable to indicate the speech loss in the audible speech stream.

13. The apparatus of claim 10, further comprising one or more input mechanisms operable to train the apparatus to recognize the speech loss in the audible speech stream.

14. The apparatus of claim 10, further comprising a display device to present the search results.

15. The apparatus of claim 10, further comprising an audio output device to present the search results.

16. A non-transitory computer program product for speech-assist, the computer program product comprising:

a computer readable storage medium having computer usable program code embodied therewith, the computer usable program code comprising computer usable program code to:

detect, via a microphone, an audible speech stream;

convert the audible speech stream to text;

detect speech loss in the audible speech stream indicating an inability to complete a thought associated with the audible speech stream;

generate a query in response to the detection of speech loss, wherein the query includes at least a portion of the text;

search a local catalog using the query to find related catalog data, wherein the catalog includes one or more of text strings, images, contact information, and global positioning system information; and present the related catalog data.

17. The non-transitory computer program product of claim 16, wherein the related catalog data is presented visually.

18. The non-transitory computer program product of claim 16, wherein the related catalog data is presented audibly.

\* \* \* \* \*